US008630837B2

(12) United States Patent
Green et al.

(10) Patent No.: US 8,630,837 B2
(45) Date of Patent: Jan. 14, 2014

(54) MULTICAST EMULATION

(75) Inventors: Harley S. Green, El Segundo, CA (US); Joshua D. Train, Chantilly, VA (US)

(73) Assignee: The Aerospace Corporation, El Segundo, CA (US)

( * ) Notice: Subject to any disclaimer, the term of this patent is extended or adjusted under 35 U.S.C. 154(b) by 832 days.

(21) Appl. No.: 12/802,954

(22) Filed: Jun. 17, 2010

(65) Prior Publication Data

US 2011/0313753 A1 Dec. 22, 2011

(51) Int. Cl.
*G06F 9/445* (2006.01)
*H04L 12/16* (2006.01)
*H04Q 11/00* (2006.01)
*G06F 15/16* (2006.01)

(52) U.S. Cl.
USPC .............................. 703/23; 370/270; 709/230

(58) Field of Classification Search
USPC .............................. 703/23; 370/270; 709/230
See application file for complete search history.

(56) References Cited

U.S. PATENT DOCUMENTS

| 7,733,868 | B2 * | 6/2010 | Van Zijst | 370/394 |
| 2003/0036896 | A1 * | 2/2003 | Skingsley et al. | 703/21 |
| 2007/0268913 | A1 * | 11/2007 | Denecheau et al. | 370/397 |
| 2009/0303997 | A1 * | 12/2009 | Zijst | 370/390 |

OTHER PUBLICATIONS

Mark Carson, NPL, "NIST Net—A linux based Network Emulation Tool", Jan. 2004.*

Carbone, Marta, et al., "Dummynet Revisited," ACM SIGCOMM Computer Communication Review, vol. 40, Issue 2 p. 12-20, Mar. 2010.
"IxNetwork IP Multicast Emulation Software," Apr. 2010, downloaded from http://www.ixiacom.com/products/display?skey=ixnetwork_ip_multicast_emulation on Jul. 26, 2013.
"netem," The Linux Foundation, Nov. 19, 2009, downloaded from http://www.linuxfoundation.org/collaborate/workgroups/networking/netem on Jul. 26, 2013.
"ns-3 Reference Manual," May 3, 2010, downloaded from http://www.nsnam.org/ns-3-8/documentation/ on Jul. 26, 2013.
"Spirent TestCenter,IGMP/MLD Host IP Multicast Base Package," Apr. 2005.
Wang, Xin, et al., IP Multicast Simulation in OPNET, 1999, downloaded from http://citeseerx.ist.psu.edu/viewdoc/summary?doi=10.1.1.18.7365 on Jul. 26, 2013.

* cited by examiner

*Primary Examiner* — Omar Fernandez Rivas
*Assistant Examiner* — Angel Calle
(74) *Attorney, Agent, or Firm* — K & L Gates LLP

(57) ABSTRACT

Systems and methods for emulating the reception of a multicast message considering simulated host channel characteristics. Methods, according to various embodiments, may comprise executing a plurality of host applications subscribing to a first multicast group address. The methods may also comprise executing a plurality of sockets. The methods may also comprise receiving a data packet indicating the first multicast group address. The data packet may be modified according to a first channel impairment condition to generate a first impaired data packet, which may be directed to a first host application selected from the plurality of host applications via a first socket selected from the plurality of sockets. The first socket may correspond to the first host. The data packet may be modified according to a second channel impairment condition to generate a second impaired data packet directed to a second host application via a second socket.

21 Claims, 6 Drawing Sheets

MULTICAST EMULATION

BACKGROUND

There are many types of protocols for transmitting data from one or more servers to one or more hosts. For example, according to unicast-type protocols, a server sends a data transmission to a single-host. The server encodes each packet of the transmission with an indication of the host for which it is intended (e.g., a Media Access Control (MAC) address, an IP address, etc.). Packets are then transmitted from the server to the host, often via one or more intermediate routers. The unicast-type transmission protocols work well for data transmissions between a single server and a single host.

Multicast-type transmission protocols are often used when there is a need for a server to send duplicative data to multiple hosts. Examples of such situations may include streaming video or voice, news streams, multi-point conferencing, etc. According to many multicast-type protocols, a server transmits each packet a limited number of times (e.g., once). Instead of being directed to a single host, a multicast transmission may be directed to a multicast group address. Hosts may subscribe to the multicast group address at one or more routers. Routers servicing one or more subscribing hosts may also subscribe to the multicast group address, for example, at an intermediate router. To effect a multicast transmission, the server may generate data packets indicating the multicast group address as the recipient. Each data packet may be initially sent to a first router. The first router may create a duplicate of the packet for each host and/or router that is subscribed to the multicast group address at the first router. Subsequent routers may operate in a similar manner until all subscribing hosts receive the packet.

In order to test communications software and/or hardware, developers often emulate different data transmission protocols. One aspect of emulation involves modeling channel impairment conditions that may exist in live networks. For example, data packets transmitted over a network may be impaired due to limitations or errors in hardware, software, transmission media, etc. Because different hosts may be at different positions on a network, each host may have different channel impairment conditions. Existing network channel emulators, however, operate either prior to host devices or at the network level of host devices. This only allows them to apply channel impairment parameters based on recipient addresses.

SUMMARY

Various embodiments are directed to systems and methods for modeling channel impairment for multicast-type protocols on a host-by-host basis for multiple host applications implemented on a single host computer device.

FIGURES

Various embodiments of the present invention are described here by way of example in conjunction with the following figures, wherein.

DESCRIPTION

Various embodiments are directed to systems and methods for emulating multicast transmissions. The emulation systems and methods may be used to test data transmission software and/or hardware short of implementing it on a live network. According to various embodiments, multiple host applications may be executed on a single computer device. Some or all of the host applications may be modeled with distinct channel reception characteristics. The channel reception characteristics of some or all of the host applications may be configurable. This may facilitate high fidelity emulation of large numbers of hosts while minimizing the hardware costs of the test bed network.

Figure 1:
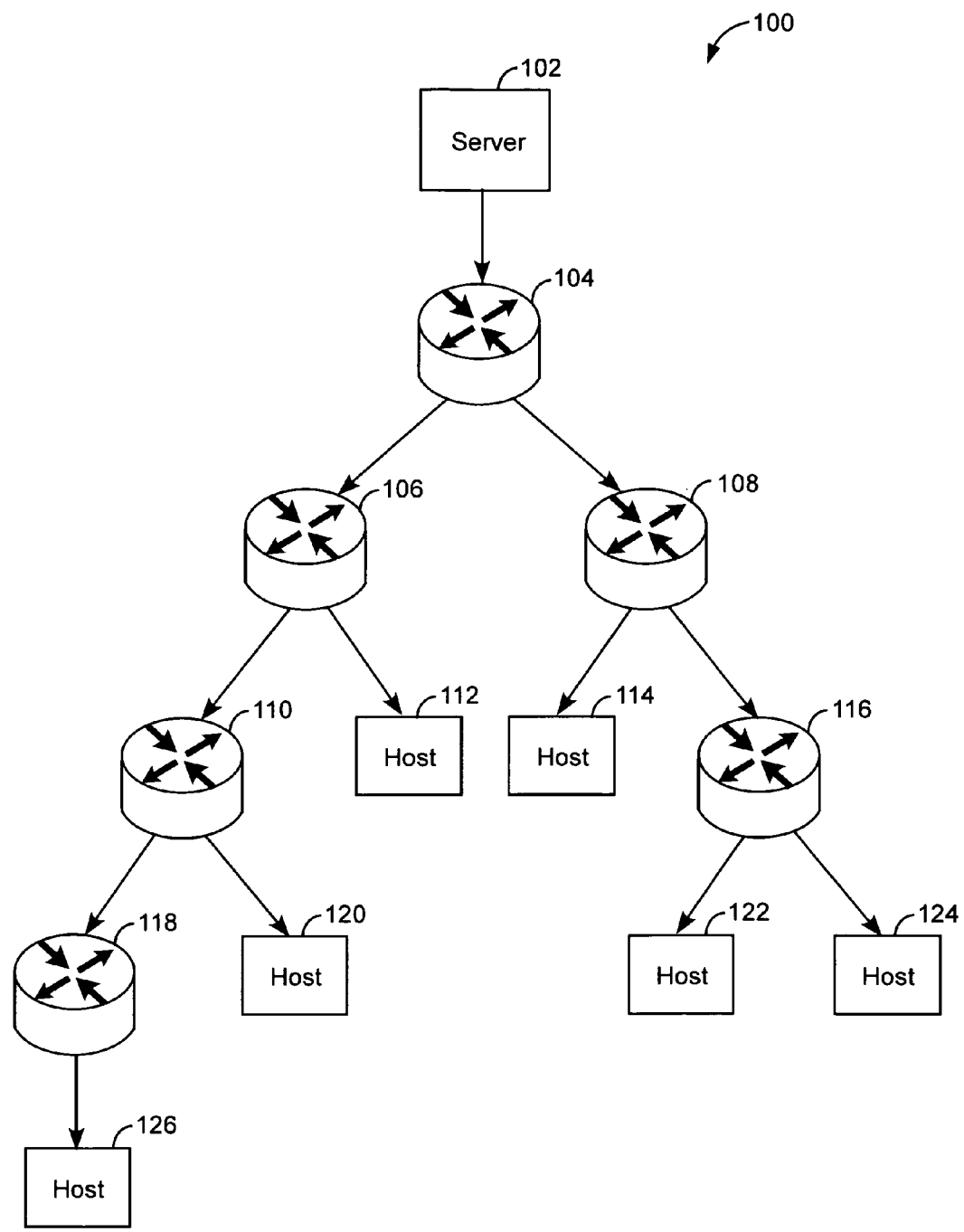
FIG. 1 shows one embodiment of a multicast transmission in a network.

In practice (e.g., in a non-emulated environment), different multicast transmission hosts receive data packets via different paths or channels. To illustrate this, FIG. 1 shows one embodiment of a multicast transmission in a network 100. A server 102 may originate the multicast transmission. Hosts 112, 114, 120, 122, 124, 126 may subscribe. For example, each host 112, 114, 120, 122, 124, 126 may subscribe to a local router (e.g., host 126 may subscribe at router 118). Routers servicing subscribing hosts may subscribe to an intermediate router (e.g., router 118 may subscribe at router 110).

The multicast data transmission may comprise the server 102 sending a data packet to the router 104. The data packet may have a data portion and an address portion indicating a multicast group address associated with the multicast. According to various embodiments, the data packet may comprise other information such as, for example, an indication or address describing the server.

The router 104 may create and send a copy of the data packet to each router and/or host that is subscribed to the multicast group address at the router 104. In the example network 100 shown in FIG. 1, the subscribers at the router 104 include routers 106 and 108. Routers 106 and 108 may perform in a manner similar to that described with respect to router 104. For example, router 106 may send a copy of the data packet to subscriber router 110 and subscriber host 112. In turn, router 110 may send a copy of the received data packet to subscriber router 118 and subscriber host 120. Router 118 may send a copy of the received data packet to subscriber host 126. Likewise, the router 108 may send a copy of the data packet to subscriber router 116 and subscriber host 114. Finally, router 116 may send a copy of the data packet to subscriber hosts 122, 124. It will be appreciated that the network 100 shows just one possible arrangement of hosts and routers in a multicast environment. Any number and combination of routers and hosts may be used in practice.

In the example shown in FIG. 1, it can be seen that different hosts 112, 114, 120, 122, 124, 126 receive the data packet via different combinations of routers and connections (e.g., different channels). It will be appreciated that different channels may have different reception characteristics. For example, different channels may have different probabilities of dropping packets, different delay characteristics, different jitter characteristics, etc. This may be the result of differences in the connections between the routers and hosts as well as differences in the software and/or hardware characteristics among the routers. For example, the connections between routers and/or hosts may be wired, wireless, or mixed. Some connections may be implemented over fiber optic channels, while others may be exclusively electronic signal-based. Some connections may be broadband, while others may not. Different connection types and combinations of connection types may lead to different channel characteristics. Also, for example, different hardware and/or software components may have different speeds and reliability. For example, a router operating at or near its capacity may show a higher packet delay and/or a higher probability of dropped packets. In addition, different routers may be designed to operate at different speeds. An accurate emulation of a multicast transmission, such as the one illustrated by FIG. 1, may take these unique channel characteristics into account.

Figure 2:
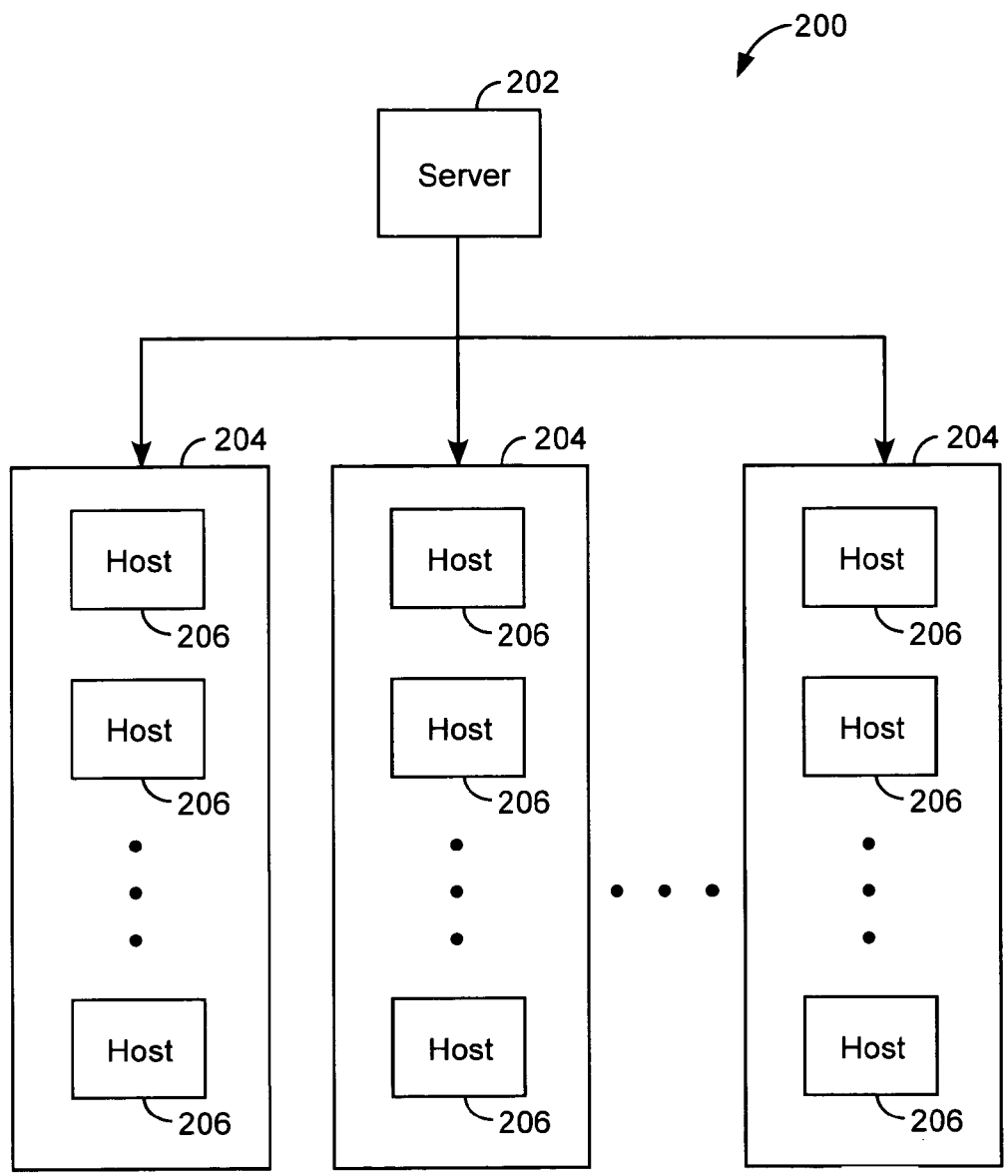
FIG. 2 illustrates one embodiment of an emulation network comprising a server and a plurality of host computer devices.

In a typical multicast implementation, such as the example shown in FIG. 1, many of the hosts 112, 114, 120, 122, 124, 126 are implemented on separate computer devices. For example, when the multicast transmission represents a streaming video, each host may be executed by a separate device associated with a consumer or consumers viewing the streaming video. When emulating a multicast transmission, however, cost and complexity concerns make it desirable to limit the number of host computer devices that may be used. Accordingly, in various embodiments, multiple hosts may be implemented on a single host computer device. FIG. 2 illustrates one embodiment of an emulation network 200 comprising a server 202 and a plurality of host computer devices 204. Each host computer device 204 may implement multiple host applications 206. Although three host computer devices 204 are shown, it will be appreciated that the actual number of host computer devices 204 may be as small as one or as large as desired. The number of host applications 206 implemented on a single host computer device 204 may, for example, be determined based on the hardware capabilities of the host computer device 204 and on desired performance. It will be appreciated that, in various embodiments, some of the host computer devices 204 may implement a single host application 206. The server 202 may be implemented on a separate computer device or, in various embodiments, may be implemented on a common computer device with one or more of the host applications 206.

Figure 3:
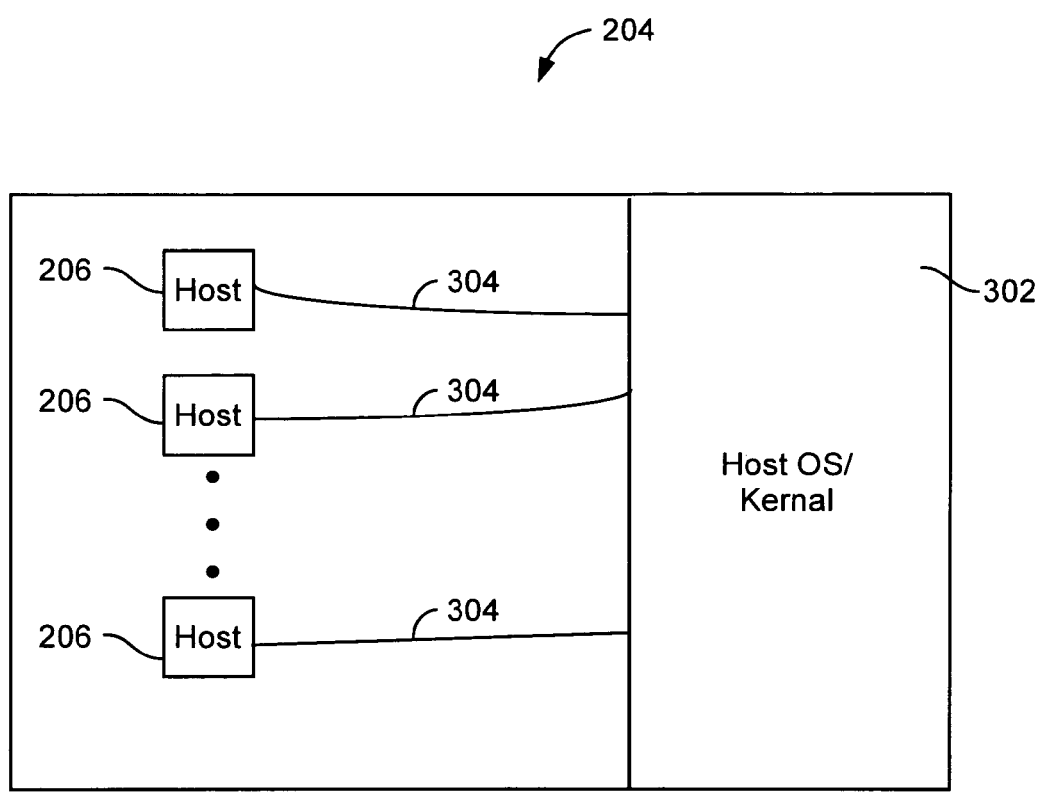
FIG. 3 illustrates one embodiment of a host computer device executing a plurality of host applications.

FIG. 3 illustrates one embodiment of a host computer device 204 executing a plurality of host applications 206. The host computer device 204 may comprise a host operating system (OS), which may also be referred to as a kernel 302. The kernel 302 may be, or comprise a portion of, any suitable operating system including, for example, FREEBSD, MICROSOFT WINDOWS, MAC OS, LINUX, UNIX, etc. The kernel 302 may implement a plurality of sockets 304. Each socket 304 may correspond to one of the host applications 206 and may facilitate network communication for the respective host applications 206. For example, when a data packet is received at the host computer device 204, it may be placed at a network data stack. The kernel 302 may retrieve the data packet and determine the correct recipient. For example, the data packet may indicate a recipient address (e.g., an IP address, a MAC address, port number, etc.). Based on the recipient address, the host computer device 204 may direct the data packet to the socket 304 corresponding to the appropriate host application or applications 206. In the case of a multicast data packet, the recipient address may indicate a multicast group address. The kernel 302 may send copies of the data packet to each socket 304 corresponding to a host application 206 that has previously indicated a subscription to the multicast group address. The host applications 206 may receive data packets by submitting a socket read request. The socket read request may be intercepted by the kernel 302, which may return to the requesting host application 206 any packet or packets directed to the application via the socket 304.

Figure 4:
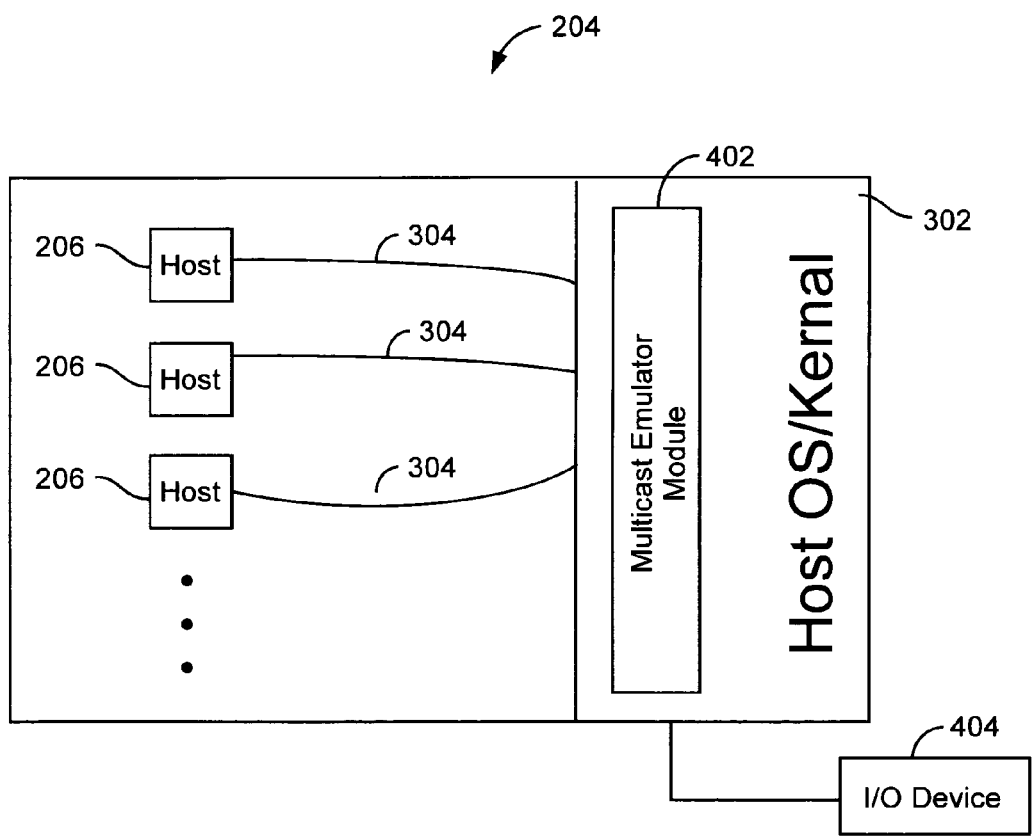
FIG. 4 illustrates one embodiment of the host computer device of FIG. 3 including a multicast emulator module.

FIG. 4 illustrates one embodiment of the host computer device 204 of FIG. 3 including a multicast emulator module 402. The multicast emulator module 402 may implement host application-specific channel impairment conditions. According to various embodiments, the multicast emulator module 402 may operate at the transport layer rather than the network layer. For example, the multicast emulator module 402 may intercept socket read requests between the host applications 206 and the kernel 302. In response to each intercepted socket read request, the multicast emulator module 402 may retrieve the data packet directed to the host application 206 via its associated socket 304. The multicast emulator module 402 may then apply a host application-specific channel impairment condition to the data packet to generate an impaired data packet. According to various embodiments, channel impairment conditions for different channels may be independent. Upon application of the host application-specific channel impairment condition, the impaired data packet may be returned to the requesting host application 206 as a response to the initial socket read request.

The host application-specific channel impairment condition may be selected to model any sort of channel impairment that may be encountered by a data transmission. For example, applying the channel impairment condition may involve applying a dropped packet probability. In practice, data packets may be dropped for a variety of reasons including, for example, software errors, hardware errors, transmission media failures, etc. Different channels (e.g., combinations of routers and transmission media) may lead to different probabilities of packet drop. Applying a dropped packet probability may comprise determining a model state for the data packet based on the probability of packet drop. Potential states for the data packet may include "dropped" and "not dropped." If the state of the data packet is determined to be "not dropped," then no drop-related change may be made in generating the impaired data packet. If the state of the data packet is determined to be "dropped," then the impaired data packet may be set to null. Setting the impaired data packet to null may comprise, for example, sending no data packet to the requesting host application 206 or, in various embodiments, may comprise sending the host application 206 an impaired data packet indicating the dropped condition.

According to various embodiments, applying the channel impairment condition may also comprise applying a delay factor between the data packet and the impaired data packet. In practice, data packets may be delayed for a variety of reasons including, for example, software errors, hardware errors, network congestion, transmission media delays, etc. Applying the delay factor may comprise holding the impaired data packet for a determined delay period. The delay period may be a constant based on the channel impairment condition, or may be randomly determined based on a channel delay probability. In addition, according to various embodiments, applying the channel impairment condition may comprise applying a jitter factor to the data packet. Applying the jitter factor may comprise shifting the phase of the data packet slightly. Similar to the delay factor, the jitter factor may be a constant, or may be randomly determined, for example, based on a channel jitter probability. It will be appreciated that applying the channel impairment condition may comprise modeling any other form or combination of forms of channel impairment in addition to or instead of drop probability, delay and jitter.

According to various embodiments, the multicast emulator module 402 may be implemented as a module of the kernel 302. In some embodiments, the functionality of the multicast emulator module 402, as described herein, may be embodied in the kernel 302. Also, in various embodiments, the functionality of the multicast emulator module 402 may be implemented by the respective sockets 304. For example, each socket 304 may be configured to apply a host application-specific channel impairment condition to data packets returned to the associated host application 206 via the socket 304.

According to various embodiments, one or more of the host computer devices 204 may be programmed to provide a user interface to a user via an input/output (I/O) device or devices 404. Examples of such devices may include monitors, keyboards, mice, etc. The user interface may comprise functionality allowing the user to define channel impairment conditions for each host application 206 executed by the host computer device 204. For example, the user may enter a drop probability, delay constant or delay determination parameters, jitter constant or jitter determination parameters, etc.

Figure 5:
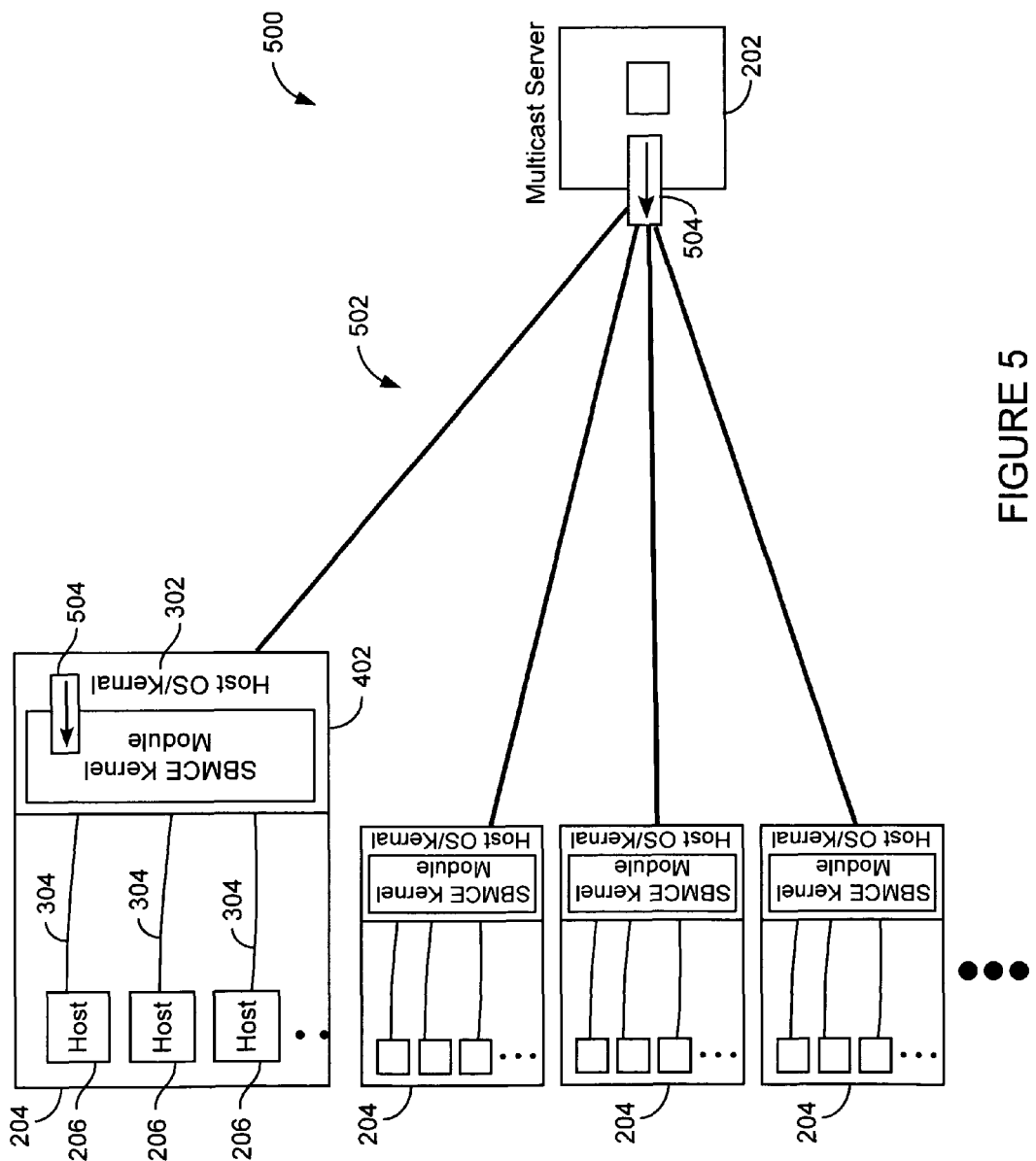
FIG. 5 illustrates one embodiment of a network for implementing the emulation methods and systems described herein.

FIG. 5 illustrates one embodiment of a network 500 for implementing the emulation methods and systems described herein. A multicast server 202 may be in electronic communication with one or more host computer devices 204. Each host computer device 204 may implement one or more host applications 206. The multicast server 202 may originate a multicast transmission comprising at least one data packet. The data packet 504 may be sent to each host computer device 204 comprising at least one host application 206 subscribing to the multicast group address associated with the multicast transmission. At the host computer devices 204, the kernel 302 may receive the data packet and place it in the networking stack. The multicast emulator module 402 may receive a socket read request from one of the host applications 206. In response to the socket read request, the multicast emulator module 402 may apply a host application-specific channel impairment condition to the data socket and then return the resulting impaired data packet to the requesting host application 206. The multicast emulator module 402 may repeat this process for each host application 206 implemented on its host computer device 204 that is a subscriber to the multicast group address associated with the data packet.

Figure 6:
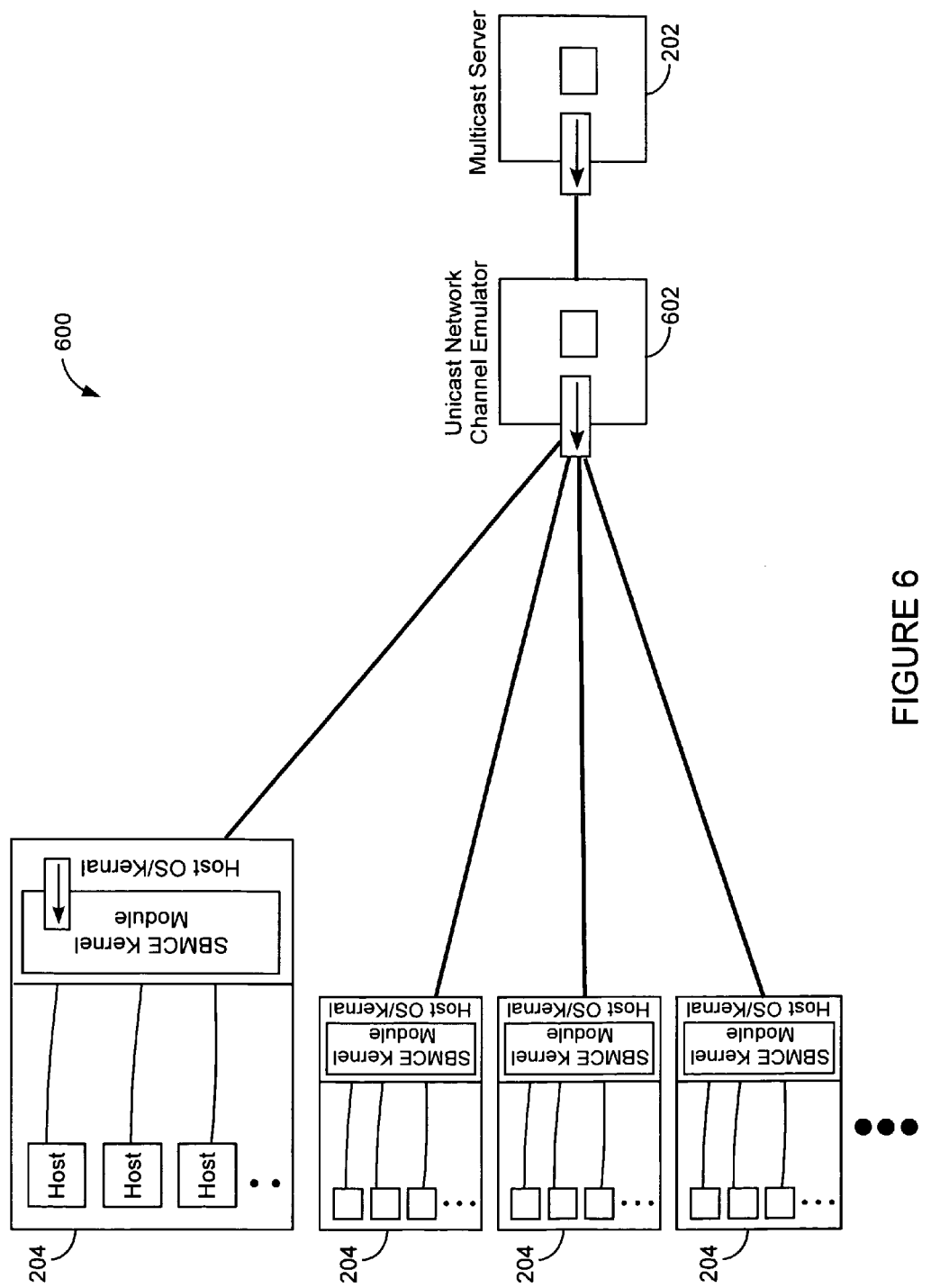
FIG. 6 illustrates one embodiment of a network for implementing unicast and/or multicast emulation.

According to various embodiments, the multicast emulation methods and systems described herein may also be used in conjunction with a unicast emulation. For example, FIG. 6 illustrates one embodiment of a network 600 for implementing unicast and/or multicast emulation. The network 600 may be similar to the network 500, but may comprise a unicast network channel emulator 602 connected in series with the multicast server 202. The multicast server 202 may originate multicast packets, with each multicast packet indicating a multicast group address. The multicast data packets may be passed by the unicast channel emulator and transmitted to the host computer devices 204, which may process the multicast data packets as described above. In addition, unicast data packets may be generated, either by the multicast server 202, the unicast network channel emulator 602 or by another component (not shown). When the unicast network channel emulator 602 receives (or generates) the unicast data packets, it may apply channel impairment conditions to the data packet based on the identification of the recipient indicated by the data packet (e.g., IP address, MAC address, port number, etc.). According to various embodiments, the multicast emulator module 402 may be programmed to ignore data packets that are not addressed to a multicast group address. In this way, impaired data packets received from the unicast network channel emulator 602 may be passed by the multicast emulator module 402 directly to the indicated host application 206 without further impairment.

Digital networks are often organized as a nested set of servers, hosts, and routers. The term "server," as used herein, may generally refer to any computer device or application on a network that originates a data transmission. The term "host," as used herein, may generally refer to any computer device or application on a network that receives a data transmission. The term "router" may refer to any computer device or application on the network that relays all or a portion of a data transmission at any point between a server and a host.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described herein may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access to an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter, or NIC can be designed to allow computers to communicate over the computer network by providing physical access to a network and an addressing system through the use of MAC addresses, for example. A repeater can be embodied is an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, computers, computer devices, and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.), and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

We claim:

1. A system for emulating the reception of a multicast message considering simulated host channel characteristics, the system comprising:
 a computer device comprising at least one processor and operatively associated memory, wherein the memory comprises instructions that, when executed by the at least one processor, cause the computer device to:
  execute a plurality of host applications, wherein each of the plurality of host applications are subscribers to a first multicast group address;
  execute a plurality of sockets, wherein each of the plurality of sockets corresponds to one of the plurality of host applications;
  receive a data packet indicating the first multicast group address;
  modify the data packet according to a first channel impairment condition to generate a first impaired data packet;
  direct the first impaired data packet to a first host application selected from the plurality of host applications via a first socket selected from the plurality of sockets, wherein the first socket corresponds to the first host application;
  modify the data packet according to a second channel impairment condition to generate a second impaired data packet; and
  direct the second impaired data packet to a second host application selected from the plurality of host applications via a second socket selected from the plurality of sockets, wherein the second socket corresponds to the second host application.

2. The system of claim 1, wherein modifying the data packet according to the first channel impairment condition comprises:
 receiving a first probability of packet drop associated with the first host application;
 considering the first probability, determining a first packet state selected from the group consisting of dropped and not dropped; and
 conditioned upon the first packet state being dropped, setting the first impaired data packet to null.

3. The system of claim 1, wherein modifying the data packet according to the first channel impairment condition comprises applying a jitter factor to the data packet.

4. The system of claim 3, wherein applying the jitter factor to the data packet comprises at least one of:
 applying a constant jitter to the data packet; and
 applying a first jitter to the data packet, wherein the first jitter is determined randomly based on a jitter probability.

5. The system of claim 1, wherein modifying the data packet according to the first channel impairment condition comprises applying a delay factor to the data packet.

6. The system of claim 5, where applying the delay factor to the data packet comprises at least one of:
 applying a constant delay to the data packet; and
 applying a first delay to the data packet, wherein the first delay is determined randomly based on a delay probability.

7. The system of claim 1, wherein the modifying the data packet according to the first channel impairment condition is executed by the first socket.

8. The system of claim 1, wherein the modifying the data packet according to the first channel impairment condition is executed by a multicast emulator module executed by the computer device.

9. The system of claim 8, wherein the multicast emulator module is a component of at least one operating system associated with the computer device.

10. The system of claim 8, wherein the first channel impairment condition is independent of the second channel impairment condition.

11. A method for emulating the reception of a multicast message considering simulated host channel characteristics, the method comprising:
 executing by a computer device a plurality of host applications, wherein each of the plurality of host applications are subscribers to a first multicast group address, wherein the computer device comprises at least one processor and operatively associated memory;
 executing by the computer device a plurality of sockets, wherein each of the plurality of sockets corresponds to one of the plurality of host applications;
 receiving by the computer device a data packet indicating the first multicast group address;
 modifying by the computer device the data packet according to a first channel impairment condition to generate a first impaired data packet;
 directing by the computer device the first impaired data packet to a first host application selected from the plurality of host applications via a first socket selected from the plurality of sockets, wherein the first socket corresponds to the first host application;
 modifying by the computer device the data packet according to a second channel impairment condition to generate a second impaired data packet; and
 directing by the computer device the second impaired data packet to a second host application selected from the plurality of host applications via a second socket selected from the plurality of sockets, wherein the second socket corresponds to the second host application.

12. The method of claim 11, wherein the modifying the data packet according to the first channel impairment condition is executed by the first socket.

13. The method of claim 11, wherein the modifying the data packet according to the first channel impairment condition is executed by a multicast emulator module executed by the computer device.

14. A system for emulating the reception of a multicast message considering simulated host channel characteristics, the system comprising:
 a computer device comprising at least one processor and operatively associated memory, wherein the memory comprises instructions that, when executed by the at least one processor, cause the computer device to:
  execute a plurality of host applications, wherein each of the plurality of host applications are subscribers to a first multicast group address;
  execute a plurality of sockets, wherein each of the plurality of sockets corresponds to one of the plurality of host applications, and wherein each of the plurality of sockets is associated with the first multicast group address;

receive a data packet indicating the first multicast group address;

execute a multicast emulator module, wherein the multicast emulator module is programmed to:
- receive from a first host application selected from the plurality of host applications a request to receive data from a first socket selected from the plurality of sockets;
- modify the data packet according to a first channel impairment condition to generate a first impaired data packet;
- direct the first impaired data packet to the first host application via the first socket;
- receive from a second host application selected from the plurality of host applications a request to receive data from a second socket selected from the plurality of sockets;
- modify the data packet according to a second channel impairment condition to generate a second impaired data packet;
- direct the second impaired data packet to the second host application via the second socket.

15. The system of claim 14, wherein modifying the data packet according to the first channel impairment condition comprises:
receiving a first probability of packet drop associated with the first host application;
considering the first probability, determining a first packet state selected from the group consisting of dropped and not dropped; and
conditioned upon the first packet state being dropped, setting the first impaired data packet to null.

16. The system of claim 14, wherein modifying the data packet according to the first channel impairment condition comprises applying a jitter factor to the data packet.

17. The system of claim 16, wherein applying the jitter factor to the data packet comprises at least one of:
applying a constant jitter to the data packet; and
applying a first jitter to the data packet, wherein the first jitter is determined randomly based on a jitter probability.

18. The system of claim 14, wherein modifying the data packet according to the first channel impairment condition comprises applying a delay factor to the data packet.

19. The system of claim 18, where applying the delay factor to the data packet comprises at least one of:
applying a constant delay to the data packet; and
applying a first delay to the data packet, wherein the first delay is determined randomly based on a delay probability.

20. The system of claim 14, wherein the multicast emulator module is a component of at least one operating system associated with the computer device.

21. The system of claim 14, wherein the first channel impairment condition is independent of the second channel impairment condition.

* * * * *